United States Patent
Kruusenberg et al.

(10) Patent No.: US 12,202,728 B2
(45) Date of Patent: Jan. 21, 2025

(54) CARBON NANOMATERIAL FOR USE AS A CATALYST

(71) Applicant: University of Tartu, Tartu (EE)

(72) Inventors: Ivar Kruusenberg, Tartu (EE); Aleksandrs Volperts, Tartu (EE); Aivars Zurins, Tartu (EE); Galina Dobele, Tartu (EE)

(73) Assignee: University of Tartu, Tartu (EE)

( * ) Notice: Subject to any disclaimer, the term of this patent is extended or adjusted under 35 U.S.C. 154(b) by 789 days.

(21) Appl. No.: 17/295,663

(22) PCT Filed: Nov. 22, 2019

(86) PCT No.: PCT/EP2019/082243
§ 371 (c)(1),
(2) Date: May 20, 2021

(87) PCT Pub. No.: WO2020/104663
PCT Pub. Date: May 28, 2020

(65) Prior Publication Data
US 2022/0017367 A1 Jan. 20, 2022

(30) Foreign Application Priority Data
Nov. 23, 2018 (GB) .................... 1819118

(51) Int. Cl.
*C01B 32/05* (2017.01)
*H01M 4/88* (2006.01)
*H01M 4/90* (2006.01)

(52) U.S. Cl.
CPC ........... *C01B 32/05* (2017.08); *H01M 4/8892* (2013.01); *H01M 4/9083* (2013.01); *C01P 2002/82* (2013.01); *C01P 2002/85* (2013.01); *C01P 2004/04* (2013.01); *C01P 2006/12* (2013.01)

(58) Field of Classification Search
None
See application file for complete search history.

(56) References Cited

U.S. PATENT DOCUMENTS 9,190,222 B1 * 11/2015 Zhang .................. D01D 5/003

FOREIGN PATENT DOCUMENTS

| CA | 2745163 | | 11/2009 |
|---|---|---|---|
| CA | 2877053 | | 6/2013 |
| CN | 105728009 | * | 7/2016 |
| CN | 106207197 | * | 12/2016 |
| CN | 106 564 874 A | | 4/2017 |

OTHER PUBLICATIONS

Wutscher, Annika et al. "Nitrogen-Doped Metal-Free Carbon Materials Derived from Cellulose as Electrocatalysts for the Oxygen Reduction Reaction". ChemElectroChem Articles. ChemPubSoc Europe. 6, 541-521 (2019) (Year: 2019).*
Kuo, H.H et al. "Effect of Carbonization Rate on the properties of a PAN/Phenolic-Based Carbon/Carbon composite". Carbon. 43, 229-239 (2005). (Year: 2005).*
Wütscher et al., Nitrogen-Doped Metal-Free Carbon Materials Derived from Cellulose as Electrocatalysts for the Oxygen Reduction Reaction, *Chemelectrochem*, vol. 6, No. 2, Nov. 20, 2018, pp. 514-521, XP055664558, Chichester—ISSN: 2196-0217, DOI: 10.1002/celc.201801217, p. 515, Figure 1, p. 519, right hand col. par. 2.
International Search Report, PCT/EP2019/082243 Feb. 2, 2017.
Office Action dated Nov. 14, 2024, for Canadian Application No. 3120741.

* cited by examiner

*Primary Examiner* — Sheng H Davis
(74) *Attorney, Agent, or Firm* — Joseph T. Leone; DeWitt LLP (57) ABSTRACT

A method for producing a carbon nanomaterial for use as a catalyst, including the steps of: (a) providing a precursor which is a source of lignin, (b) heating the precursor to an activation temperature from 700° C. to 800° C. in the presence of an alkali solution in order to produce an activated precursor, and (c) reacting the activated precursor with a source of nitrogen atoms in order to dope the activated precursor with nitrogen atoms, wherein the precursor is heated in step (b) to the activation temperature at a rate of at least 500° C. per minute.

9 Claims, 7 Drawing Sheets

CARBON NANOMATERIAL FOR USE AS A CATALYST

The present invention relates to a method for producing a carbon nanomaterial for use as a catalyst, and in particular to a method which activates a source of lignin such as alder wood char.

In recent decades, a great interest has risen to develop metal-free and cheap, biomass-derived electrocatalysts for oxygen reduction reaction (ORR).

Research into different renewable energy conversion and storage devices such as batteries, fuel cells and photovoltaic systems has increasing importance, as pollution levels caused by the large scale consumption of the fossil fuels rises year by year. Fuel cells are considered to be one of the most important technologies, because of their high efficiency, grid-independency and long operating times in comparison to conventional battery technologies. Despite the many research efforts made to improve the performance, efficiency and durability of fuel cell technology, large scale commercialization has not yet been achieved. One of the drawbacks is the high price of widely used platinum-based catalysts. These catalysts also suffer from catalyst poisoning due to carbon monoxide. Therefore it has become crucial to find cheaper, platinum-free catalysts, exhibiting similar electrochemical activity and higher stability.

Oxygen reduction reactions (ORR) at the fuel cell cathode have very slow kinetics, because of the strong O=O bond. It is important therefore to especially focus on speeding up these reactions.

Good ORR activity for wood-based nitrogen doped carbon has been reported in M. Borghei, J. Lehtonen, L. Liu, O. J. Rojas, Advanced Biomass-Derived Electrocatalysts for the Oxygen Reduction Reaction, Adv. Mater. (2017) 1703691. Nevertheless, unexpected poor homogeneity of the final materials can often be seen and is one of the drawbacks associated with this approach.

A method for developing wood-based carbon catalysts for low-temperature fuel cells is disclosed in "design and manufacturing of highly active wood-derived carbon materials for low temperature fuel cells" (Kruusenberg et al.) [https://www.ise-online.org/ise-conferences/annmeet/folder/22-topical-program-BoA.pdf, page 129].

CN109012590 A (UNIV SOUTH CHINA TECHNOLOGY) discloses lignin-based transition metal-nitrogen-doped carbon material useful for fuel cell, comprising mixing transition metal salt with alkali lignin at 300 deg. C. and carbonizing at 600-1000 deg. C. with dicyandiamide nitrogen source.

CN106564874 A (UNIV NINGBO TECHNOLOGY) discloses preparing a carbon nanomaterial comprising mixing lignin and nitrogen containing compound (dicyandiamide) after pyrogenation of the lignin at 300-600 deg. C. and carbonization at 700-1200 deg. C.

In accordance with the first aspect of the present invention, there is provided a method for producing a carbon nanomaterial for use as a catalyst, including the steps of:
 (a) providing a precursor which is a source of lignin (such as alder char or black liquor),
 (b) heating the precursor to an activation temperature from 700° C. to 800° C. in the presence of an alkali solution (such as a hydroxide solution) in order to produce an activated precursor, and
 (c) reacting the activated precursor with a source of nitrogen atoms in order to dope the activated precursor with nitrogen atoms,
 wherein precursor is heated in step (b) to the activation temperature at a rate of at least 500° C. per minute.

It has unexpectedly been discovered that heating the precursor in step (b) to the activation temperature at a fast heating rate results in a carbon nanomaterial which has improved electrode properties, particularly in terms of conductivity.

In a preferred embodiment the heating rate is at least 1000° C. per minute, most preferably at least 4000° C. per minute. Exemplary rates are 5 to 10 seconds (preferably 1 to 3 seconds) to heat from room temperature to 800° C.

Step (c) may take place at a temperature from 700-900° C. The source of nitrogen atoms may be a source of ammonia. Preferably, the source of nitrogen atoms is dicyandiamide (DCDA).

The method preferably includes an additional step of:
 (d) heating the doped precursor of step (c) in an inert atmosphere at a temperature from 700-900° C. The doped precursor of step (c) is ground in order to increase its surface area either before or during step (d).

The heating step (d) may take place at a rate similar to that of step (b). The sample may then be removed from the source of heat and allowed to cool at room temperature in the presence of inert gas (rather than in the furnace). This helps to reduce the overall cost of the synthesis procedure by saving time and energy spent on the furnace heating and whole process.

Polyvinylpyrrolidone may be used as a surfactant in the activation step. It helps to distribute carbon particles before the heating step when it is mixed with the source of nitrogen atoms. However, any suitable surfactant may be used.

In a preferred embodiment, alder wood chips are used as the biological waste to fabricate catalyst material. Activated high surface area carbon (AC) was obtained by using a chemical activation method with NaOH at higher temperatures, followed by nitrogen doping at 800° C. by using dicyandiamide (DCDA) as a nitrogen precursor. The obtained N-doped carbon exhibits surprisingly high electrocatalytic activity for the ORR, which is similar to that of the commercial Pt/C (20 wt % Pt/C) in alkaline media. The proposed synthetic strategy provides a novel, simple and green route to prepare low-cost and high efficiency N-doped carbons as the next generation catalysts for the fuel cells and metal-air batteries.

In accordance with a second aspect of the present invention, there is provided a carbon nanomaterial obtainable by means of a method as defined above.

In accordance with a third aspect of the present invention, there is provided a fuel cell including a catalyst formed from a carbon nanomaterial as defined above.

A number of preferred embodiments of the present invention will now be described with reference to the drawings, in which.

Herein, we report a facile strategy to synthesize a cheap and electrochemically active nano-carbon material from the renewable and biological resource, wood biomass. The ORR activity of the catalyst was investigated in 0.1 M KOH solution by employing the rotating disc electrode (RDE) method. RDE is a voltammetric method where the current at a working electrode is measured while the potential between the working electrode and a reference electrode is swept linearly in time. All the products of the potential sweep are continually swept away from the electrode as the electrode is constantly rotating during the experiment. This, in turn, allows more precisely to investigate the catalytic properties of the catalyst.

Transmission electron microscopy (TEM), X-ray photoelectron spectroscopy (XPS) and Raman spectroscopy were employed to obtain more information about catalyst morphology and composition. The product contains a remarkably low content of nitrogen (0.8%) and the material exhibit outstanding electrocatalytic activity with low onset potential and high current density, similar to that of commercial Pt/C catalyst in alkaline medium. The results clearly ascertain that wooden biomass can be easily transformed into novel carbon nanostructures with superior ORR activity and possibility to be used in fuel cells and metal-air batteries.

EXPERIMENTAL

Preparation of N-Doped Wood-Based Catalyst

Figure 8:
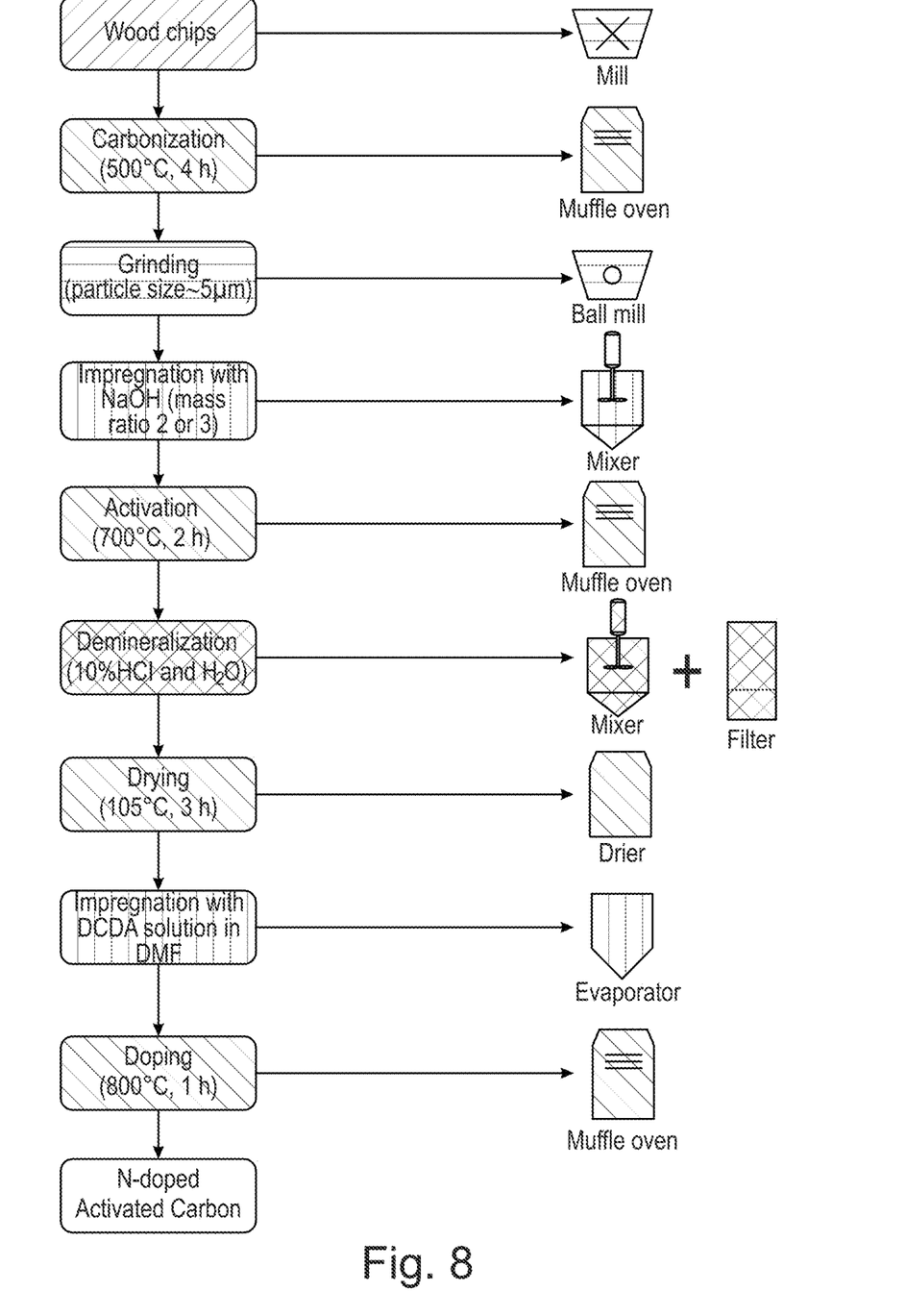
FIG. 8 is a flow chart showing steps of a preferred method in accordance with the invention.

A flow chart showing a preferred embodiment of the present invention is shown in FIG. 8. For synthesising this catalyst material, alder wood was used as a precursor material. Alder wood chips were first carbonized at 500° C. for 4 h followed by grinding to smaller particles (down to 5 µm). Activated carbon (AC) based on wood char, was obtained using chemical activation method with NaOH, activator ratio to precursor K=2 and activation temperature 700° C. in argon atmosphere. The activation temperature of 700° C. was reached in 5-10 seconds. The goal for activation is to achieve high specific surface area (SSA). Activation procedure was followed by washing with 10% HCl acid and water in the mixer and filtration of the activated carbon. Activated carbon was dried at 105° C., before nitrogen doping.

Nitrogen was introduced into activated samples using dicyandiamide (DCDA) solution in dimethylformamide (DMF) with mass ratio carbon material/DCDA 1:20. DMF was then removed in rotary evaporator. Doping was performed at 800° C. for 1 hour in argon atmosphere. Specific surface area (m$^2$/g), total pore volume (mm$^3$/g), and average pore width (nm) were determined from nitrogen adsorption isotherms using Quantachrome Nova 4200e instrument. Nitrogen content was evaluated using Vario Macro CHNSO device. The BET (brunauer emmet teller) surface area of the catalyst material is quite high (2435 m$^2$ g$^{-1}$) and the average diameter of the pores is 1.36 nm, which shows that this material mostly has micropores. The sample was later ball-milled using zirconia beads and secondary pyrolysis was performed in the tube furnace at 800° C. in flowing nitrogen atmosphere. The BET surface area changed very little (after second pyrolysis 2245 m$^2$ g$^{-1}$), but total volume of pores ($V_{total}$) and average pore diameter value (L) increased. The BET measurement results are presented in the Table 1.

TABLE 1

The physical parameters of wood-derived nitrogen-doped carbon before and after secondary pyrolysis.

| | S, m$^2$/g | $V_{total}$, cm$^3$/g | L, nm |
|---|---|---|---|
| ERT-01 | 2435 | 1.27 | 1.36 |
| ERT-01 (after second pyrolysis) | 2245 | 1.34 | 1.63 |

Physical Characterization

The shape and size of catalyst particles were examined by using a transmission electron microscope Tecnai G2 F20 X-TWIN equipped with an EDAX spectrometer and an r-TEM detector. For microscopic examinations, 10 mg of sample was first sonicated in 1 ml of ethanol for 1 h and then deposited on Cu grid covered with a continuous carbon film. Thermo Scientific ESCALAB 250Xi spectrometer with monochromatic Al Kα radiation (hv=1486.6 eV) excitation was used for X-ray photoelectron spectroscopy (XPS) analysis. The 40 eV and 20 eV pass energy values of a hemispherical electron energy analyzer were used for the survey and high resolution spectra acquisition, respectively. The energy scale of the system was calibrated with respect to Au 4f7/2, Ag 3d5/2 and Cu 2p3/2 peak positions. ESCALAB 250Xi Avantage software was used for the peak deconvolution and atomic concentration calculations procedures. All spectra fitting procedures were performed using symmetrical peaks and 70:30 Gauss-Lorentz function ratio unless stated otherwise in the text.

Raman spectra was recorded using in Via Raman (Renishaw, UK) spectrometer equipped with thermoelectrically cooled (−70° C.) CCD camera and microscope. Raman spectra was excited with 532 nm radiation from diode pumped solid state (DPSS) laser (Renishaw, UK). The 20×/0.40 NA objective lens and 1800 lines/mm grating were used to record the Raman spectra. The accumulation time was 40 s. To avoid damage of the sample, the laser power at the sample was restricted to 0.6 mW. The Raman frequencies were calibrated using the polystyrene standard. Parameters of the bands were determined by fitting the experimental spectra with Gaussian-Lorentzian shape components using GRAMS/A1 8.0 (Thermo Scientific) software.

Electrode Preparation and Electrochemical Characterisation

Glassy carbon (GC) disc electrodes with a geometric (A) area of 0.2 cm$^2$ were used as a substrate material for carrying out the rotating disk electrode (RDE) measurements. Electrodes were polished using 1 and 0.3 µm aluminium oxide ($Al_2O_3$, Buehler) paste. After polishing, the electrodes were sonicated for 5 minutes in isopropanol (Sigma-Aldrich) and in Milli-Q water. The catalyst ink with the concentration of 4 mg mL$^{-1}$ in isopropanol was prepared by using 0.25% of AS-04 OH$^-$ ionomer (Tokuyama Corp., Japan), followed by sonication for 1 h. The electrodes were evenly covered with the catalyst material by drop coating with 20 μl of previously prepared catalyst ink. After coating the electrodes were dried in the oven at 60° C.

The electrochemical measurements were carried out by using RDE method. Pine AFMSRCE (Pine, USA) rotator and speed controlling unit were used for the RDE measurements. The software used for controlling the experiments was Nova 2.1.2 (Metrohm Autolab P.V., The Netherlands) and the potential was applied with a potentiostat/galvanostat Autolab PGSTAT 128N (Metrohm Autolab P.V., The Netherlands).

All the electrochemical tests were carried out in three-electrode cell by using Pt foil as a counter and saturated calomel electrode (SCE) as a reference electrode. All the potentials in this work are referred to SCE electrode.

Electrochemical measurements were performed in 0.1 M KOH solution at room temperature (23±1° C.). Solution was saturated with $O_2$ (6.0) to study ORR and for measuring background, the solution was saturated with $N_2$ (5.0). A continuous flow of gases was maintained over the solution during the measurement.

RDE method together with 1000 potential cycles at a scan rate of 100 mV s$^{-1}$ were applied to test the stability of the catalyst material. Rotation rate was set to 960 rpm during the stability tests. Linear-sweep voltammograms (LSVs) were recorded after every 100 cycles by using a scan rate of 10 mV s$^{-1}$.

Results and Discussion

Physical Characterisation of N-Doped Wood-Based Catalysts

Figure 1:
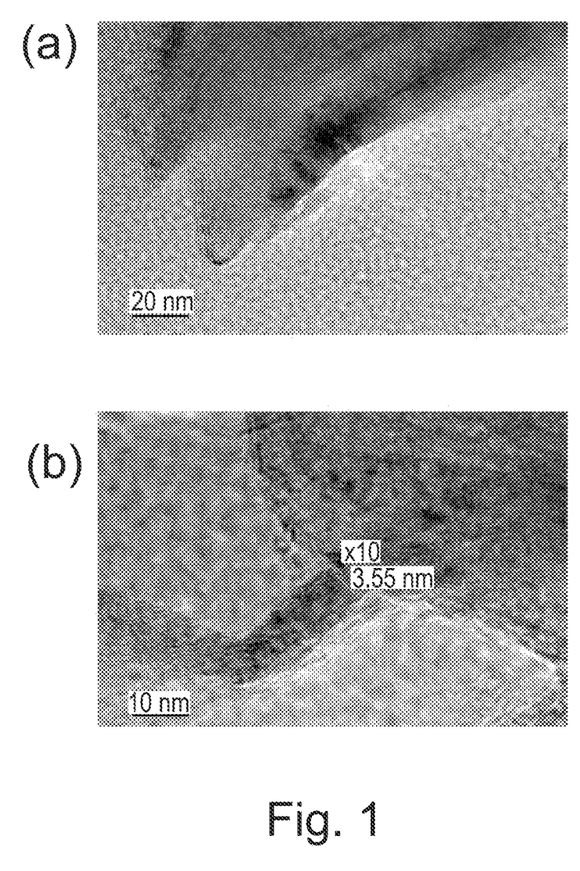
FIG. 1 shows TEM images of wood-derived nitrogen-doped carbon material.

The micro-structure of the prepared N-doped wood-based catalyst material was investigated with TEM and is shown on FIGS. 1a and b. It can be seen from FIG. 1b, that the material consists of graphitic lattice fringes and areas of amorphous carbon that has porous structure. Thickness of the 10× layered catalyst particle is 3.55 nm and the interlayer spacing between two layers is therefore ~0.35 nm. Usually the interlayer spacing of few layered graphene is also 0.35 nm, which is indicating clearly the graphene-alike structure of the catalyst material.

Figure 2:
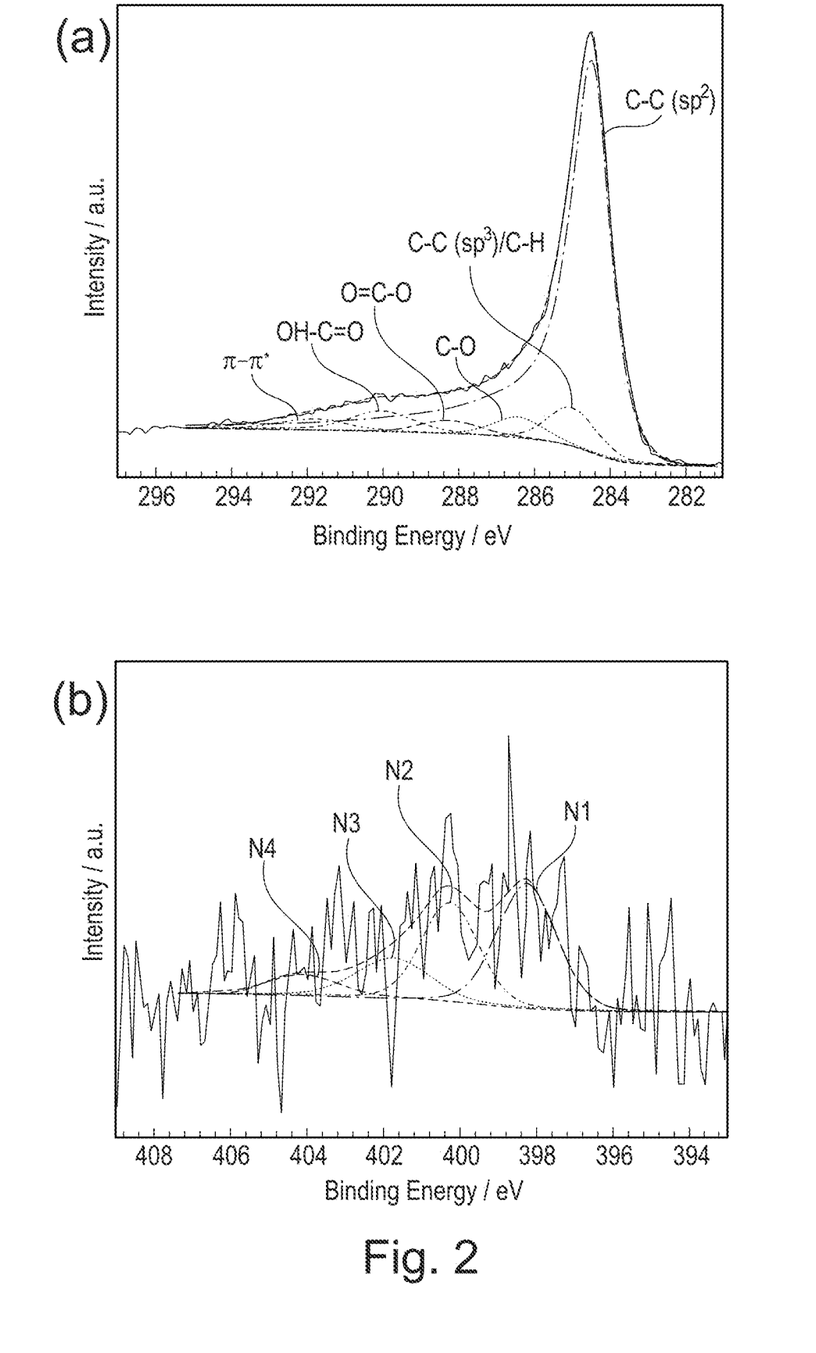
FIG. 2 shows XPS survey spectra, namely (a) deconvulated C1 spectra and (b) deconvulated N1 spectra.

Surface composition of the catalyst was studied by using XPS. From the XPS survey spectra, peaks of C1s, O1s, N1s can be detected. The high-resolution XPS spectra of C1s and N1s are presented on the FIGS. 2a and 2b respectively. C1s peak consists mostly of sp$^2$ hybridized carbon. The N1s peak intensity is quite low, but it can also be deconvoluted. As it is widely believed that the electrochemical activity is rather related to different nitrogen surface types than the overall nitrogen content, the N1s peak was fitted and four peaks can be identified: N1 (pyridinic-N 398.23 eV), N2 (pyrrolic-N 400.26 eV), N3 (graphitic-N 401.76 eV), N4 (pyridinic-N-oxide 404.16 eV). The overall nitrogen content on this catalyst material was only 1.84%, but most of the nitrogen was in pyridinic form (43%). The second important nitrogen form is graphitic-N, which content in sample was 17%.

Figure 3:
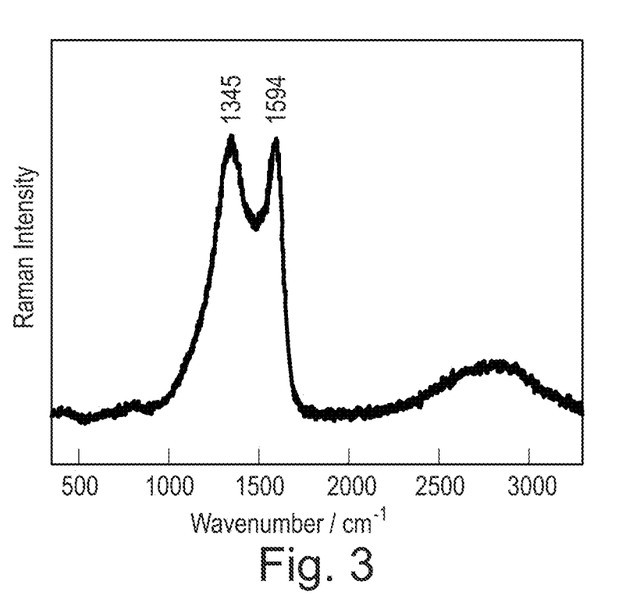
FIG. 3 is a Raman spectrum of N-doped alder wood char-based catalyst with an excitation wave length of 532 nm.

Raman spectroscopy is able to provide rich information on structure and disorder of carbon network in carbon-based materials. FIG. 3 shows 532 nm excited Raman spectrum of N-doped alder wood char based catalyst material in the spectral region of 400-3200 cm$^{-1}$. Two intense bands near 1345 and 1594 cm$^{-1}$ belong to characteristic D and G modes of carbon network. The $E_{2g}$ symmetry G band is associated with in-plane relative motion of carbon atom pairs in sp$^2$ hybridization. This mode is always allowed in carbon-based materials. The $A_{1g}$ symmetry D mode arises from breathing vibrations of aromatic rings; presence of defects is required for this mode activation. Parameters of these bands were estimated by fitting the experimental contour by four Gaussian-Lorentzian form components in the frequency region of 900-1800 cm$^{-1}$. The widths of D and G bands determined as full width at half maximum (FWHM) were found to be 204 and 79 cm$^{-1}$, respectively. Such high width of the bands and high relative intensity ratio of D and G bands (I(D)/I(G)≈1) indicate considerable disorder in the carbon network of studied material.

Rotating Disc Electrode Studies of $O_2$ Reduction

The ORR activity of the previously prepared N-doped wood-based carbon material was studied on GC electrodes in 0.1 M KOH solution by using RDE method.

Figure 4:
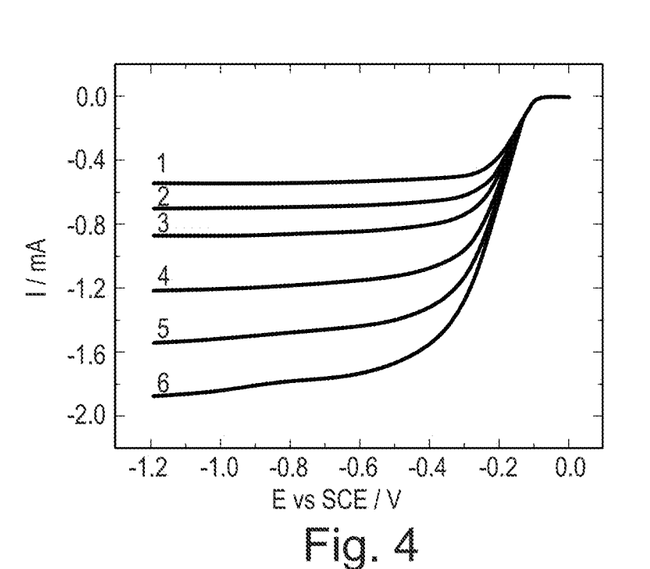
FIG. 4 shows RDE polarisation curves for oxygen reduction on GC electrodes modified with N-doped wood-based catalyst in $O_2$ saturated 0.1 M KOH. n=10 mV s$^{-1}$. w=(1) 360, (2) 610, (3) 960, (4) 1900, (5) 3100 and (6) 4600 rpm.

The results of the RDE experiment are shown on FIG. 4. To evaluate the ORR activity of a catalyst material, the onset potential onset ($E_{onset}$) is an important criterion, which for the nitrogen-doped wood-based carbon is approximately at −0.09 V vs SCE. One can also see from FIG. 4 that despite increasing the rotation rate, the onset potential remains the same indicating at least short-term stability of the catalyst. Similar tendencies have been previously observed by Hu et al., who studied nitrogen doped hydroxypropyl methylcellulose for ORR in the alkaline media. C. Hu, Y. Zhou, R. Ma, Q. Liu, J. Wang, Reactive template synthesis of nitrogen-doped graphene-like carbon nanosheets derived from hydroxypropyl methylcellulose and dicyandiamide as efficient oxygen reduction electrocatalysts, J. Power Sources. 345 (2017) 120-130. Even though the electrocatalytic activity of their catalyst was similar to the catalyst presented in the current work, it is important to note that the catalyst loading used by Hu et al., was higher than used herein. Also Han et al. have synthesized N-doped hollow-core, mesoporous nanospheres with the BET surface area of 770 m$^2$ g$^{-1}$ and nitrogen content from 4.4-6.7%, but in their work, the catalyst loading was also higher. C. Han, S. Wang, J. Wang, M. Li, J. Deng, H. Li, Y. Wang, Controlled synthesis of sustainable N-doped hollow core-mesoporous shell carbonaceous nanospheres from biomass, Nano Res. 7 (2014) 1809-1819. Thereby it is evident that the electrocatalytic ORR activity presented in current work is comparable or even higher than the one presented for the similar catalyst materials beforehand.

The Koutecky-Levich (K-L) plots were also constructed using the $O_2$ reduction reaction polarisation data shown on FIG. 4. This was done using the K-L equation:

$$\frac{1}{I} = \frac{1}{I_k} + \frac{1}{I_d} = -\frac{1}{nFAkc_{O_2}^b} - \frac{1}{0.62nFAD_{O_2}^{2/3}\nu^{-1/6}c_{O_2}^b\omega^{1/2}} \quad (1)$$

where I is the experimentally measured current, from which the background current has been subtracted, $I_k$ and $I_d$ are the kinetic and diffusion limited currents, respectively, k is the electrochemical rate constant for $O_2$ reduction, $c_{O_2}^b$ is the concentration of oxygen in the bulk (1.2×10$^{-6}$ mol cm$^{-3}$), F is the Faraday constant (96,485 C mol$^{-1}$) $D_{O_2}$ is the diffusion coefficient of $O_2$ in 0.1 M KOH (1.9×10$^{-5}$ cm$^2$ s$^{-1}$), ν is the kinematic viscosity of the solution (0.01 cm$^2$ s$^{-1}$) and ω is the rotation rate of the electrode (rad s$^{-1}$).

Figure 5:
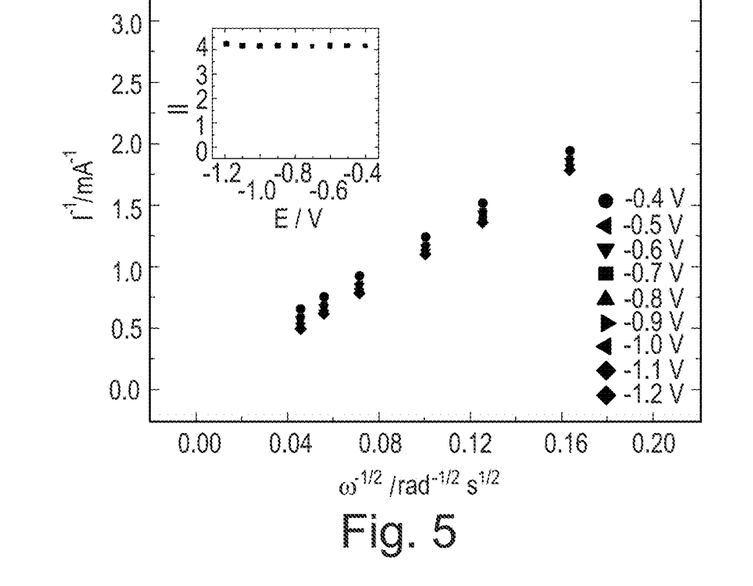
FIG. 5 shows K-L plots for oxygen reduction on N-doped wood-based electrode in 0.1 M KOH at various potentials. The inset figure shows the changes of n values in studied potential range.

FIG. 5. shows the K-L plots retrieved from the ORR polarisation curves at different rotation rates in 0.1 M KOH. The lines are nearly linear and the intercepts of the extrapolated K-L lines are close to zero, indicating that the reduction process is diffusion limited within the potential range studied. The number of electrons transferred per $O_2$ molecule (n) was also calculated at various potentials using the K-L equation (the inset figure of FIG. 5). The value of n is close to 4 in the whole potential range. Usually the n value of 4 indicates to the fact, that oxygen is directly reduced to water, but it is impossible to determine via the K-L analysis if this is a direct 4-electron reduction of oxygen or reduction via $HO_2^-$ intermediate (2 $e^-$+2 $e^-$ reduction) pathway.

Figure 6:
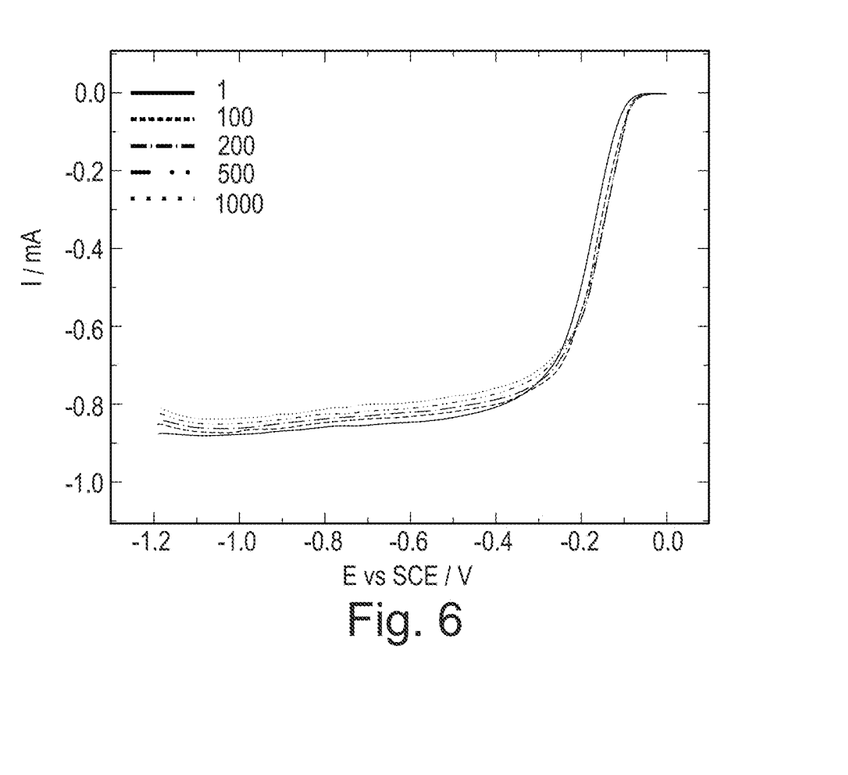
FIG. 6 is a graft showing stability of GC electrodes modified with N-doped wood-based catalyst during 1000 cycles. w=960 rpm.

Stability is also an important factor for fuel cell or metal-air battery applications. Stability test results for N-doped wood-based catalyst during 1000 potential cycles between 0 and −1.2 V vs SCE are shown on FIG. 6. The onset and half-wave potentials did not change much during the 1000 potential cycles in alkaline media. However, slight change in diffusion current values can be observed, meaning that presumably the catalyst morphology on the electrode changes, but there is no effect on the active sites. Another potential and more likely cause of this could be that small amount of catalyst material detaches from the electrode during the stability test.

Figure 7:
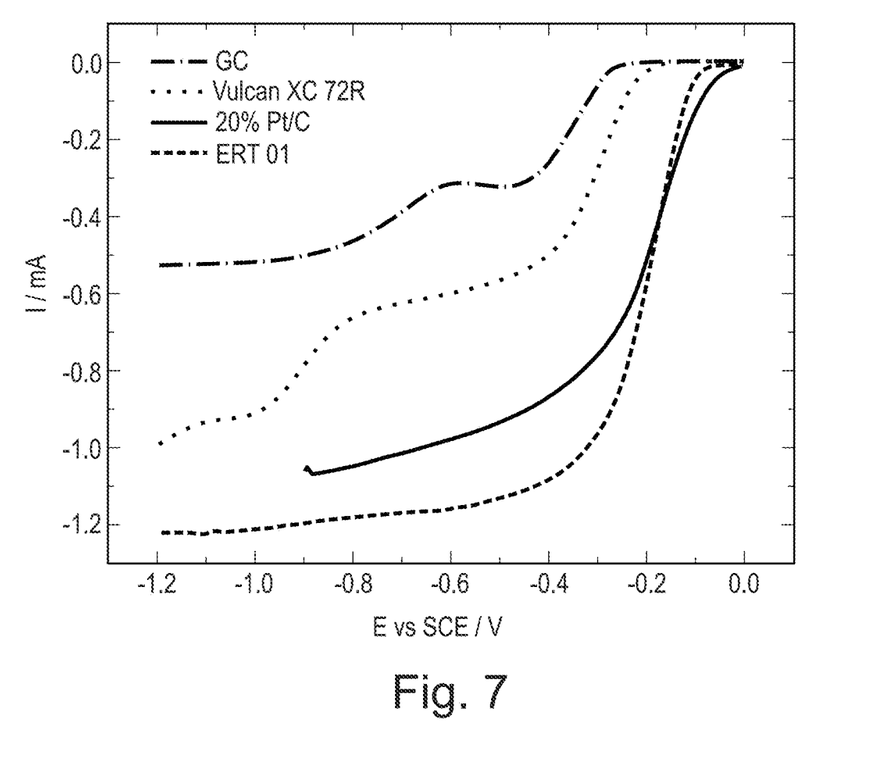
FIG. 7 shows RDE voltammetry curves for oxygen reduction on GC electrode and GC electrodes modified with different catalyst materials in $O_2$-saturated 0.1 M KOH. v=10 mV s$^{-1}$. w=1900 rpm.

The comparison of oxygen reduction polarisation curves in 0.1 M KOH solution is shown on FIG. 7. The RDE polarisation curves for GC, Vulcan XC 72R and commercial 20% Pt/C catalyst materials have been added for comparison purposes. The onset potential and half-wave potential for N-doped wood-based catalyst is much more positive compared to bare GC and most commonly use catalyst support, Vulcan XC 72R. The slight negative shift of the onset potential is observable in comparison with 20% Pt/C, but at the same time diffusion limited current density is reaching much higher value, in comparison to the commercial platinum catalyst.

In a further experiment, glassy carbon (GC) disc electrodes with a geometric (A) area of 0.2 cm2 were used as a substrate material for carrying out the rotating disk electrode (RDE) measurements. Six different catalyst inks were made out of the catalysts and heat treated at the following different heating rates (see FIG. 9):
1. Heating from 23° C. to 800° C. in 1-3 s
2. Heating from 23° C. to 800° C. in 5-10 s
3. Heating from 23° C. to 800° C. at a ramp rate of 10° C./min
4. Heating from 23° C. to 800° C. at a ramp rate of 5° C./min
5. Heating from 23° C. to 800° C. in 5-10 s (additional example to 2)
6. Heating from 23° C. to 800° C. at a ramp rate of 40° C./min Catalyst ink with the concentration of 4 mg mL−1 in isopropanol was prepared by using 0.25% of AS-04 OH— ionomer (Tokuyama Corp., Japan) as a binder, followed by sonication for 1 h. The electrodes were evenly covered with the catalyst materials by drop coating with 20 μl of the previously prepared catalyst ink. After coating the electrodes were dried in the oven at 60° C.

The electrochemical measurements were carried out by using RDE method. Radiometer rotator and speed controlling unit were used for the RDE measurements. The potential was applied with a potentiostat/galvanostat Autolab PGSTAT 128N (Metrohm Autolab P.V., The Netherlands).

All the electrochemical tests were carried out in a three-electrode cell by using Pt foil as a counter and saturated calomel electrode (SCE) as a reference electrode. All the potentials in this work are referred to SCE electrode.

Electrochemical measurements were performed in 0.1 M KOH solution at room temperature (23±1° C.). The solution was saturated with $O_2$ (6.0) to study oxygen reduction reaction.

Figure 9:
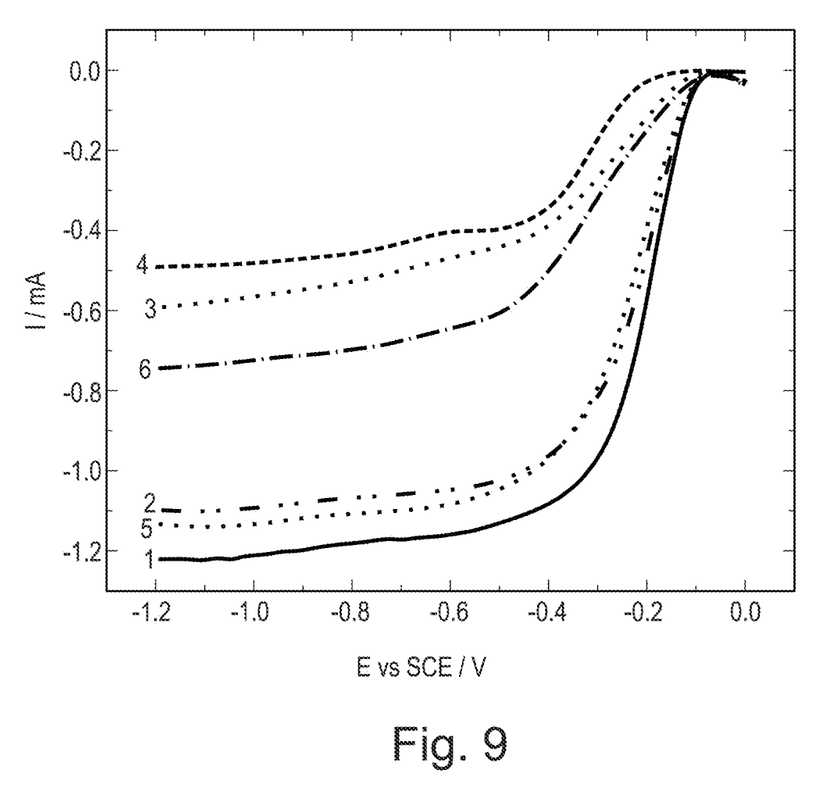
FIG. 9 is a graph showing the effect of the rate of heating to the activation temperature on the electrode characteristics of the final product of the invention.

The RDE results presented in FIG. 9. allows us to adequately compare the catalytic properties of catalyst material pyrolyzed at different heating rates. The graph shows the electrical current passing through each catalyst material as a function of potential difference. Note that the axes are inverted, so that as the voltage increases (moving from right to left on the X axis) the current increases (moving from high to low along the Y axis). It can be seen that samples 1, 2 and 5 pass a noticeably higher current than samples 3, 4 and 6 at the same voltage, making them more suitable for use as electrodes.

The above-described electrocatalytic properties of the synthesized N-doped wood-derived carbon catalysts may be associated with the extremely high surface area and enlarged pore volume of the catalyst, which increased during the secondary pyrolysis. It could also be associated with high percentage of pyridinic nitrogen in the N-doped material and lack of stacking defects of graphene layers. A synergy of all of these properties should be responsible for the remarkable ORR activity of the novel wood-derived electrocatalyst. Overall, this work blazes an avenue for the development of highly effective, cheap and electrochemically active nanocarbon materials for energy storage and conversion applications, by using wooden biomass as renewable and biological resource of carbon.

In summary nitrogen-doped wood-derived carbon catalyst was fabricated by using alder wood chips as carbon source. Compared with the glassy carbon and most commonly used commercial carbon XC 72R, wood-derived N-doped carbon exhibits remarkably improved electrocatalytic ORR activity. An onset potential of −0.09 V vs SCE and a half-wave potential of −0.16 V vs SCE in an alkaline medium, along with excellent stability, is making it a promising alternative to state-of-the-art precious metal based catalysts and excellent catalyst carrier for many different applications. The superiority of the wood-derived catalysts is demonstrated with even similar ORR activity to the commercial 20% Pt/C catalyst in 0.1 M KOH solution. Such electrocatalytic activity in alkaline media can be explained by the synergistic effect of high surface area and pore volume, high pyridinic nitrogen content, and low content of stacking defects in the N-doped carbon catalyst. Because of that, this work may propose a facile synthetic strategy to design highly active multifunctional wooden biomass based materials towards different energy storage and conversion applications.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in UK patent application number 1819118.9, from which this application claims priority, and in the abstract accompanying this application are incorporated herein by reference.

The invention claimed is:
1. A method for producing a carbon nanomaterial for use as a catalyst, including the steps of:
   (a) providing a precursor which is a source of lignin,
   (b) heating the precursor to an activation temperature from 700° C. to 800° C. in the presence of an alkali solution in order to produce an activated precursor, and
   (c) reacting the activated precursor with a source of nitrogen atoms in order to dope the activated precursor with nitrogen atoms,
   wherein the precursor is heated in step (b) to the activation temperature at a rate of at least 4000° C. per minute.

2. A method for producing a carbon nanomaterial for use as a catalyst, including the steps of:
(a) providing a precursor which is a source of lignin,
(b) heating the precursor to an activation temperature from 700° C. to 800° C. in the presence of an alkali solution in order to produce an activated precursor, and
(c) reacting the activated precursor with a source of nitrogen atoms in order to dope the activated precursor with nitrogen atoms,
(d) heating the doped precursor of step (c) in an inert atmosphere to a temperature from 700-900° C.,
wherein the precursor is heated in step (b) to the activation temperature at a rate of at least 500° C. per minute, and
wherein the doped precursor of step (c) is ground in order to increase its surface area either before or during step (d).

3. A method for producing a carbon nanomaterial for use as a catalyst, including the steps of:
(a) providing a precursor which is a source of lignin,
(b) heating the precursor to an activation temperature from 700° C. to 800° C. in the presence of an alkali solution in order to produce an activated precursor, and
(c) reacting the activated precursor with a source of nitrogen atoms in order to dope the activated precursor with nitrogen atoms,
(d) heating the doped precursor of step (c) in an inert atmosphere to a temperature from 700-900° C.,
wherein the precursor is heated in step (b) to the activation temperature at a rate of at least 500° C. per minute, and
wherein the product of step (d) is removed from the source of heat and allowed to cool at room temperature in the presence of inert gas.

4. A method for producing a carbon nanomaterial for use as a catalyst, including the steps of:
(a) providing a precursor which is a source of lignin,
(b) heating the precursor to an activation temperature from 700° C. to 800° C. in the presence of an alkali solution in order to produce an activated precursor, and
(c) reacting the activated precursor at a temperature from 700-900° C. with a source of nitrogen atoms in order to dope the activated precursor with nitrogen atoms,
(d) heating the doped precursor of step (c) in an inert atmosphere to a temperature from 700-900° C.,
wherein the precursor is heated in step (b) to the activation temperature at a rate of at least 500° C. per minute.

5. A method as claimed in claim 4, wherein the alkali solution of step (b) is a hydroxide solution.

6. A method as claimed in claim 4, wherein the source of nitrogen atoms in step (c) is dicyandiamide (DCDA).

7. A method as claimed in claim 4, wherein the source of lignin is alder char or black liquor.

8. A method for producing a fuel cell including the steps of:
(1) producing a carbon nanomaterial for use as a catalyst by carrying out a method including the steps of:
(a) providing a precursor which is a source of lignin,
(b) heating the precursor to an activation temperature from 700° C. to 800° C. in the presence of an alkali solution in order to produce an activated precursor, and
(c) reacting the activated precursor with a source of nitrogen atoms in order to dope the activated precursor with nitrogen atoms,
wherein the precursor is heated in step (b) to the activation temperature at a rate of at least 4000° C. per minute, and
(2) incorporating said carbon nanomaterial in a fuel cell as a catalyst.

9. A method for producing a fuel cell including the steps of:
(1) producing a carbon nanomaterial for use as a catalyst by carrying out a method including the steps of:
(a) providing a precursor which is a source of lignin,
(b) heating the precursor to an activation temperature from 700° C. to 800° C. in the presence of an alkali solution in order to produce an activated precursor, and
(c) reacting the activated precursor with a source of nitrogen atoms at a temperature from 700-900° C. in order to dope the activated precursor with nitrogen atoms,
wherein the precursor is heated in step (b) to the activation temperature at a rate of at least 500° C. per minute, and
(2) incorporating said carbon nanomaterial in a fuel cell as a catalyst.

* * * * *

UNITED STATES PATENT AND TRADEMARK OFFICE
CERTIFICATE OF CORRECTION

| | | |
|---|---|---|
| PATENT NO. | : 12,202,728 B2 | Page 1 of 1 |
| APPLICATION NO. | : 17/295663 | |
| DATED | : January 21, 2025 | |
| INVENTOR(S) | : Ivar Kruusenberg et al. | |

It is certified that error appears in the above-identified patent and that said Letters Patent is hereby corrected as shown below:

On the Title Page

Item (73), the Assignee should read --UP CATALYST OÜ--.

Signed and Sealed this
Thirteenth Day of May, 2025

Coke Morgan Stewart
*Acting Director of the United States Patent and Trademark Office*